United States Patent
Fratarcangeli

(10) Patent No.: US 10,008,020 B1
(45) Date of Patent: Jun. 26, 2018

(54) METHOD FOR INTERACTIVE, REAL-TIME ANIMATION OF SOFT BODY DYNAMICS

(71) Applicant: CHALMERS TEKNISKA HÖGSKOLA AB, Göteborg (SE)

(72) Inventor: Marco Fratarcangeli, Göteborg (SE)

(73) Assignee: CHALMERS TEKNISKA HÖGSKOLA AB, Göteborg (SE)

( * ) Notice: Subject to any disclaimer, the term of this patent is extended or adjusted under 35 U.S.C. 154(b) by 2 days.

(21) Appl. No.: 15/387,039

(22) Filed: Dec. 21, 2016

(51) Int. Cl.
*G06T 17/20* (2006.01)
*G06T 13/20* (2011.01)
*G06T 19/20* (2011.01)

(52) U.S. Cl.
CPC ............. *G06T 13/20* (2013.01); *G06T 17/20* (2013.01); *G06T 19/20* (2013.01); *G06T 2207/20072* (2013.01); *G06T 2207/20092* (2013.01); *G06T 2219/2012* (2013.01)

(58) Field of Classification Search
None
See application file for complete search history.

(56) References Cited

U.S. PATENT DOCUMENTS

| | | | | |
|---|---|---|---|---|
| 2007/0085851 | A1* | 4/2007 | Muller | G06T 13/20 345/474 |
| 2017/0098327 | A1* | 4/2017 | Gornowicz | G06T 13/80 |

OTHER PUBLICATIONS

Fratarcangeli, Marco, and Fabio Pellacini. "Scalable partitioning for parallel position based dynamics." Computer Graphics Forum. vol. 34. No. 2. 2015.*

Fratarcangeli, Marco, and Fabio Pellacini. "Towards a Massively Parallel Solver for Position Based Dynamics." Proceedings of SIGRAD 2014, Visual Computing, Jun. 12-13, 2014, Göteborg, Sweden. No. 106. Linköping University Electronic Press, 2014.*
Allard, Jérémie, Hadrien Courtecuisse, and François Faure. "Implicit FEM solver on GPU for interactive deformation simulation." GPU computing gems Jade Edition. 2011. 281-294.*
Huynh, David. "Cloth simulation using hardware tessellation." (2011).*
Bender, Jan, Matthias Müller, and Miles Macklin. "Position-Based Simulation Methods in Computer Graphics." Eurographics (Tutorials). 2015.*
Bouaziz S. et al.,"Projective Dynamics: Fusing Constraint Projections for Fast Simulation" ACM Trans. Graph., vol. 33, No. 4, Jul. 2014, pp. 154:1-154:11.

(Continued)

*Primary Examiner* — Ryan M Gray
(74) *Attorney, Agent, or Firm* — Buchanan Ingersoll & Rooney P.C.

(57) ABSTRACT

There is presented a method for interactive, real-time animation of soft body dynamics, comprising the steps of: providing a 3D model of a soft body, the model comprising a set of vertices connected by edges; defining a set of physical constraints between vertices in the 3D model, the set of constraints forming a system of linear equations comprising a set of unknowns representing the positions of the vertices; applying a Brooks-Vizing node coloring algorithm in order to partition the system of linear equations into a set of partitions each including an independent subset of unknowns; for each partition, applying a Gauss-Seidel based solver in parallel in order to determine an approximation of the unknowns; and using the determined approximation of the unknowns to update the 3D model. There is also presented an animation system configured to perform the above-described method.

23 Claims, 3 Drawing Sheets

(56) References Cited

OTHER PUBLICATIONS

Liu T. et al., "Fast Simulation of Mass-Spring Systems" ACM Transactions on Graphics, vol. 32, No. 6, Article 209, Publication date: Nov. 2013, pp. 209:1-209:7.
Grable D. A. et al., "Fast Distributed Algorithms for Brooks-Vizing Colourings" BRICS RS-97-37, Journal of Algorithms, vol. 37, No. 1, Dec. 1997, pp. 85-120.
Luby M., "A simple parallel algorithm for the maximal independent set problem", "Proceedings of the Seventeenth Annual ACM Symposium on Theory of Computing", ACM, 1985, pp. 1-10.

* cited by examiner

METHOD FOR INTERACTIVE, REAL-TIME ANIMATION OF SOFT BODY DYNAMICS

TECHNICAL FIELD OF THE INVENTION

The present invention relates generally to computer graphics animation. More specifically, the present invention relates to a method for interactive, real-time animation of soft body dynamics.

BACKGROUND OF THE INVENTION

Many applications in the field of computer graphics require animation of soft bodies, i.e. deformable objects such as cloth, vegetation, hair, muscles, etc. Examples of such applications include video games, computer-aided design, and education tools like surgical simulators. Soft-body animation typically involves solving a large set of equations governing the dynamics of the object to be animated, and an increasing number of applications requires the dynamical equations to be solved extremely fast.

A case in point of an application with particularly severe speed requirements is interactive animation in real time, such as when a video game player moves an object across the screen using a computer mouse, or a finger if the screen is a touch screen. In order to achieve high quality interactivity at 30 frames per second the total amount of time available to update all the components of a scene is 33 milliseconds, and only a fraction of this time can be devoted to advancing the dynamics of the animated objects. Often, the available time slice for physically-based animations is as little as 5 milliseconds. The accuracy of the solution of linear iterative solvers depends on the number of iterations; however only a small number of iterations can be accommodated in such a tight time budget. Traditionally, this has typically forced the use of simple objects composed from few constraints whose dynamics can be solved in few iteration steps, something which may reduce animation quality.

The dynamical equations are usually solved using linear iterative techniques, two popular examples being the Gauss-Seidel method and the Jacobi method. However, such methods often fail to make optimal use of parallelism, which is becoming an increasingly important technique for speeding up computations. The Gauss-Seidel method, for example, is very difficult to implement on parallel computing architectures. Parallel implementation of the Jacobi method is easier, but due to slow convergence the method can still not meet the high speed requirements of interactive soft body animation in real time.

Hence, further efforts aimed at finding innovative methods for real time, interactive animation of soft bodies are warranted. In particular, there is a need for fast methods that are sufficiently accurate to produce animations that are realistic enough for a wide range of applications. Further, there is a need for methods that are simple to implement on parallel computing architectures. Still further, there is a need for methods that are easily scalable and/or provide stable solutions.

SUMMARY OF THE INVENTION

It is an object of the present invention to provide an alternative and/or improved method for interactive, real-time animation of soft body dynamics.

According to a first aspect of the invention, there is presented a method for interactive, real-time animation of soft body dynamics, comprising the steps of:

providing a 3D model of a soft body, said model comprising a set of vertices connected by edges;
providing a first iteration of the animation;
defining a set of physical constraints between vertices in the 3D model, said set of constraints forming a system of linear equations, $Yq=b$, where q is a set of unknowns representing positions of the vertices, Y is a sparse matrix, and b is an energy function comprising effects of external forces;
solving said system of linear equations by:
  applying a Brooks-Vizing node coloring algorithm to an undirected graph corresponding to the matrix Y, thereby partitioning the system of linear equations into a set of partitions each including an independent subset of unknowns,
  for each partition, applying a Gauss-Seidel based solver in parallel, thereby solving the system of linear equations to determine an approximation of the unknowns;
using the determined approximation of the unknowns to update the 3D model; and
providing a next iteration of the animation.

According to a second aspect of the invention, there is presented a non-transitory medium comprising computer code configured to perform the above-described method.

According to a third aspect of the invention, there is presented an animation system for interactive, real-time animation of soft body dynamics, comprising: an input port configured to receive instructions from a user, wherein the input port enables the user to interact in real time with a 3D model of a soft body to be animated; an output port connectable to a display for displaying an animation of the soft body based on the received instructions from the user; a modelling unit configured to provide the 3D model, said model comprising a set of vertices connected by edges, the modelling unit being further configured to define a set of physical constraints between vertices in the 3D model, said set of constraints forming a system of linear equations, $Yq=b$, where q is a set of unknowns representing positions of the vertices, Y is a sparse matrix, and b is an energy function comprising effects of external forces; a coloring unit configured to apply a Brooks-Vizing node coloring algorithm to an undirected graph corresponding to the matrix Y, thereby partitioning the system of linear equations into a set of partitions each including an independent subset of unknowns; a solving unit configured to, for each partition, apply a Gauss-Seidel based algorithm in parallel, thereby solving the system of linear equations to determine an approximation of the unknowns; and an updating unit configured to update the 3D model based on the determined approximation of the unknowns.

An external force may for example be a force pulling the soft body or a force exerted on the soft body when it strikes a different object. An external force may be defined by a boundary condition that restricts the movement of the soft body in some way.

The present invention provides an innovative combination of the Brooks-Vizing coloring algorithm and the Gauss-Seidel solver, which combination enables the parallel computation of the solution in a faster way than the Jacobi method. In fact, the system can be solved sufficiently fast to enable interactive, real time animation of soft body dynamics.

Parallelization of the typically serial Gauss Seidel algorithm by partitioning a sparse matrix is known per se. However, such partitioning has been considered far too time consuming to perform in each frame of a real time animation. For example, graph coloring methods have been used in applications such as train scheduling and electrical network design, where the time constraints for the computation are not as severe as in real time animation.

The inventors of the present invention have surprisingly realized that, even though the step of graph coloring necessarily adds computational complexity, the specific combination of steps according to the present invention cooperate synergistically in a way that more than offsets the added complexity. As a result, the method can be advantageously implemented in commodity parallel hardware, such as modern GPUs and multicore CPUs. The resulting combined method is sufficiently fast and accurate for the generation of physically based animations that are visually plausible and particularly suitable for video games and many other applications.

The method generates solutions that are significantly more stable than those generated by many prior art methods. If the linear system is symmetric positive definite, e.g., in the case of mass-spring networks, the method always converges even in the case of a small number of iterations used for each frame, allowing the method to be used in case of small time budgets available for the physics computation.

Further, the method is easily scalable. The number of parallel steps to perform a full iteration is equal to the number of colors (typically equal to the maximum degree of the graph or less) and does not depend on the number of constraints in the system. The number is also considerably smaller than the maximal number of constraints influencing a single vertex in the polygonal mesh representing the animated object. In case of the triangular and tetrahedral meshes usually employed in computer graphics, this number is small enough to allow interactive animation of a very large of number constraints. It should be noted that the method is capable of handling meshes without any restriction on connectivity, i.e. there is no restriction on how many other vertices a vertex may be connected to.

An additional benefit arises from the fact that the residual error in sequential Gauss-Seidel depends on the order in which the equations are solved. As the Brooks-Vizing graph coloring method is randomized, this order will, according to the present invention, also be randomized. Consequently, the residual error will be more quickly removed.

The Brooks-Vizing coloring algorithm produces partitions of similar size, which leads to balanced workloads in each parallel Gauss-Seidel processing, making sure that none of the computational units are overloaded or underutilized.

Further, it has been found that the chosen type of graph coloring algorithm (Brooks-Vizing) is sufficiently fast to be run as often as required, even in each frame. Thus the workload remains balanced even when the topology of the system changes, e.g. in case of constraints derived by collisions. Moreover, it has been found that, when appropriately implemented, the chosen graph coloring algorithm is fast enough to allow real-time coloring of very large graphs, even graphs as large as those representing physically animated objects discretized as meshes and a large number of interacting constraints. This is at least partly because the algorithm can use considerably fewer colors than the maximal degree of the graph. It is desirable to have as small a number of colors as possible in order to reduce the number of kernel executions.

The energy function may be determined by one of Projection Dynamics and Position Based Dynamics. The method is particularly suitable for solving the large sparse linear systems from these frameworks which support a wide range of different types of constraints.

The number of partitions may be equal to or less than the maximum degree of the undirected graph. The maximum degree of the graph equals the maximum degree of its nodes. The method can operate using a small number of colors, something which increases computational speed.

The number of partitions may be equal to $\Delta/s$, where $\Delta$ is equal to the maximum degree of the undirected graph and s is a shrinking factor greater than one. The shrinking factor may be equal to the minimum degree of the undirected graph. The minimum degree of the undirected graph is here an integer equal to or greater than 2. The effect of the shrinking factor is to reduce the number of colors. The present inventors have found that increasing the shrinking factor too much leads to slower colorings without meaningful gains in terms of reducing the number of colors and that using the minimal degree of the graph as the value of the shrinking factor leads to the best colorings.

The step of solving said system of linear equations may comprise performing successive over-relaxation. This may increase the convergence speed.

The amplification factor $\omega$ of the successive over-relaxation may be in the range from 1.75 to 1.95. The inventors have found that using an amplification factor in this range often results in a particularly fast convergence. The inventors have also found that higher values of the amplification factor $\omega$ may lead to spurious deformation modes or instabilities.

The step of applying a Brooks-Vizing node coloring algorithm may be performed in parallel with respect to several nodes of the undirected graph. By this step being performed "in parallel with respect to several nodes" is meant that the computations related to these nodes are performed separately from each other, typically simultaneously on different processor cores, threads or the like.

The step of applying a Brooks-Vizing node coloring algorithm may comprise, for each node of the undirected graph, associating a list of $\Delta v/s$ colors with the node, where $\Delta v$ is the degree of the node and s is a shrinking factor greater than one. This will be referred to as the "initialization phase".

The step of applying a Brooks-Vizing node coloring algorithm may comprise randomly selecting, for each node, a color in the list of colors associated with the node. This will be referred to as the "tentative coloring phase".

The step of applying a Brooks-Vizing node coloring algorithm may comprise, for each node, if the color selected for the node is different from the colors of all neighboring nodes, accepting the color selected for the node and removing the color selected for the node from the palettes of the neighboring nodes. This will be referred to as the "conflict resolution phase".

In the conflict resolution phase, the method may further comprise, for each node, if the color selected for the node is the same as the color of at least one neighboring node and if the node has a higher index than all the neighboring nodes, accepting the color selected for the node. The present inventors have found that this Hungarian heuristic strategy may greatly reduce the number of coloring rounds needed by the algorithm to color all the nodes of the graph and, hence, to increase computational speed.

The step of applying a Brooks-Vizing node coloring algorithm may comprise adding a color to the lists of colors which have run out of colors. This will be referred to as the "feed the hungry phase".

It is noted that the invention relates to all possible combinations of features recited in the claims.

BRIEF DESCRIPTION OF THE DRAWINGS

The present invention will be described in more detail with reference to the appended drawings, showing currently preferred embodiments of the invention.

DETAILED DESCRIPTION OF CURRENTLY PREFERRED EMBODIMENTS

Figure 1A:
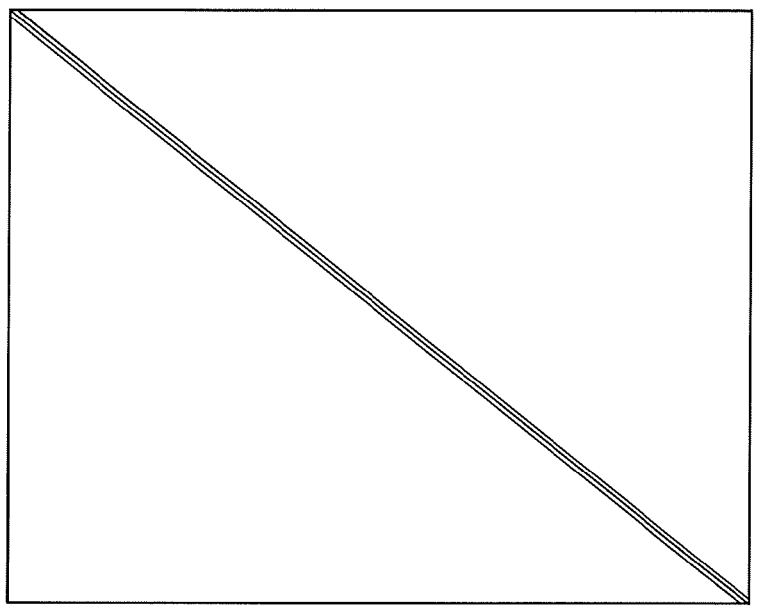
FIGS. 1a and 1b show schematic illustrations of adjacency matrices.

A method for interactive, real-time animation of soft body dynamics according to an embodiment of the invention will be described in the following with reference to FIGS. 1 and 2. The present invention may, however, be embodied in many different forms and should not be construed as limited to the embodiment set forth herein; rather, this embodiment is provided for thoroughness and completeness, and fully convey the scope of the invention to the skilled person.

The soft body to be animated, henceforth referred to as the "object" for brevity, is represented as a 3D model defined by a set of vertices connected by edges. The edges and vertices may form polygons that approximate the outer surface of the object or polyhedrons that approximate the volume of the object. The polygons and polyhedrons may for example be irregular triangles and irregular tetrahedrons, respectively. Hence, the object may be discretized as a mesh by the vertices and edges.

The method includes defining a set of physical constraints involving the vertices and/or edges. The constraints may for example be related to the distances between the vertices, i.e. the lengths of the edges, and/or the volume of polyhedrons formed by the vertices and edges. Typical examples of such constraints are bending constraints, volume preservation constraints and constraints based on models describing a relationship between distance and force, such as mass-spring models. The constraints may relate each vertex to its nearest neighbors and/or neighbors farther away.

The constraints generate forces that enter into the mathematical equations governing the dynamics of the object. These equations may be derived using a variety of approaches, for example Projective Dynamics which will be used in this case. In that approach, the object is modelled as a set of constrained particles, the constraints expressing relationships between subsets of the particles, such as a spring connecting two particles. The position of the particles are the positions of the vertices of the mesh. The state of the system of particles is defined by the position $q_t \in R^{3 \times n}$ of the n particles, and their velocity $v_t \in R^{3 \times n}$. The forces $f_{int}$, which are generated internally by the constraints, are defined as the gradient of the sum of energy functions $W_i$, i.e. $f_{int} = -\Sigma_i \nabla_q W_i (q)$. Given the state $(q_i, v_i)^{(k)}$ and the current external force $f_{ext}$ at time $t_k$, the solver computes the internal forces $f_{int}$ and the next state $(q_i, v_i)^{(k+1)}$ using the implicit Euler scheme $$\begin{cases} q^{(k+1)} = q^{(k)} + hv^{(k+1)} \\ v^{(k+1)} = v^{(k)} + hM^{-1}(f_{ext} + f_{int}) \end{cases}$$

where h is the time step, M is the mass matrix and the forces are evaluated at $t_{k+1}$. It has been shown (S. Bouaziz et al., 2014, "Projective dynamics: Fusing constraint projections for fast simulation", ACM Trans. Graph. 33, 4 (July), 154:1-154:11) that this is equivalent to solving a minimization problem that can be efficiently tackled with an iterative local/global alternation approach. For each iteration, q is first projected on the nearest point p lying on the energy-free manifold defined by each constraint (the local step). Then, the distance of the current state $(q_i, v_i)^{(k)}$ from the resulting local configurations $p_i$ is minimized (the global step). The local step is inherently parallel because it is performed for each constraint independently from the other constraints. The global step is equivalent to solving the large sparse linear system Yq=b:

$$\underbrace{\left(\frac{M}{h^2} + \sum_i S_i^T A_i^T A_i S_i\right)}_{Y} q = \underbrace{\frac{Ms}{h^2} + \sum_i S_i^T A_i^T B_i p_i}_{b} \quad (1)$$

with $s^{(k)} = q^{(k)} + hv^{(k)} + h^2 M^{-1} f_{ext}$, where $s^{(k)}$ is the explicit integration of the state $q^{(k)}$ ignoring the internal forces, $A_i$ and $B_i$ are constant matrices that define the constraint i (for the definition of common constraints, see: T. Liu et al., 2013, "Fast simulation of mass-spring systems", ACM Trans. Graph. 32, 6 (November), 214:1-214:7; and S. Bouaziz et al., 2014, "Projective dynamics: Fusing constraint projections for fast simulation", ACM Trans. Graph. 33, 4 (July), 154:1-154:11). Further, $S_i$ is the selector matrix to select only the particles influenced by the constraint i.

The global step is the main computational hurdle when computing how the object moves in response to an external force. In the presently described embodiment, this computation starts by advancing the dynamics of the system with an explicit Euler step (step 1 in Table 1 below). Then, a coloring algorithm divides the set of vertices in independent partitions; each one corresponding to a color (step 2 in Table 1). The solver iterates K times over all of the constraints. Each particle $q_i$ belonging to partition $C_j$ is processed in parallel. All the corrections induced by all the constraints sharing the particle are computed and summed together (steps 3-6 in Table 1). Then, a Successive Over-Relaxation (SOR) is applied to further accelerate the convergence speed (step 7 in Table 1). The amplification factor ω of the SOR may for example equal 1.9. It should be noted that the SOR step is optional and may or may not be performed in other embodiments. Finally, the solution of the solver is assigned to the current position of the particles, and the velocity is updated accordingly (steps 8-9 in Table 1).

TABLE 1

| | |
|---|---|
| 1: | $q^0 \leftarrow q_t + hv_t + h^2 M^{-1} f_{ext}$ |
| 2: | Graph coloring: V = {$q_i$, i = 1, . . . , N} is partitioned into p colors $C_1, \ldots, C_p$, such that $\forall (q_i, q_j) \in C_i$, $q_i$ and $q_j$ are not shared by any constraint |
| 3: | for k = 0 . . . K − 1 do |
| 4: |   for each partition $C_i \subset V$ do |
| 5: |     for each $q_i \in C_i$ do in parallel |
| 6: |       $\hat{q}_i^{k+1} \leftarrow$ solve $(q_i^0, q_i^k)$ |
| 7: |       $q_i^{k+1} \leftarrow w (\hat{q}_i^{k+1} - q_i^{k-1}) + q_i^{k-1}$ |
| 8: | $q_{t+1} \leftarrow q^K$ |
| 9: | $v_{t+1} \leftarrow (q_{t+1} - q_t)/h$ |

The graph coloring procedure (step 2 in Table 1) of the presently described embodiment will now be described in more detail with reference to Table 2 below which illustrates a simple, randomized algorithm belonging to the class of Brooks-Vizing node coloring algorithms (D. A. Grable and A. Panconesi, 2000, "Fast distributed algorithms for Brooks-Vizing colorings", Journal of Algorithms 37, 1, 85-120). The input of the algorithm is the undirected graph G corresponding to the matrix Y in Equation 1 above. Every node v of the graph G is initially assigned a palette of available colors denoted as $P_v$. Colors are identified by consecutive natural numbers. V denotes the set of nodes, and U denotes the set of currently uncolored nodes.

During the initialization phase (steps 1-3 in Table 2) of the presently described embodiment, a list of $\Delta_v$/s colors is given to the palette of each node v, where $\Delta_v$ is the degree of v and s>1 is the palette shrinking factor, which is constant for the whole graph. Then, the actual coloring round procedure starts and is repeated until all the nodes have been colored. Each coloring round comprises three parallel steps. In the tentative coloring phase (steps 5-6 in Table 2), a color c(v) is randomly chosen among the available colors in the palette $P_v$, and assigned to v. Then, in the conflict resolution phase (steps 7-12 in Table 2), each node checks that none of its neighbors has selected the same tentative color. If this occurs, the coloring of v is accepted and c(v) is removed from the palette of the neighbors. In the feed the hungry phase (steps 14-16 in Table 2), a color is added to the palettes which have run out of colors. The maximal amount of colors allowed is $\Delta_v+1$, but typically this maximal threshold is not reached.

Thus, the graph coloring procedure is iterative. If not all of the randomly selected colors are accepted during the first round of conflict resolution, which is typically the case, there will be a second round of tentative coloring in which a new random color is given to each node whose color was not accepted. This is followed by second rounds of conflict resolution and feed the hungry, and the cycle is repeated until the coloring of every node has been accepted.

To speed up the conflict resolution phase, the Hungarian heuristic may be employed (M. Luby, 1985, "A simple parallel algorithm for the maximal independent set problem", "Proceedings of the Seventeenth Annual ACM Symposium on Theory of Computing", ACM, New York, N.Y., USA, STOC '85, 1-10). According to this approach, in case of conflict, if the node has the higher index among its neighbors then the coloring is considered legitimate.

TABLE 2

| | | |
|---|---|---|
| 1: | U ← V | ▷ Initialization |
| 2: | for all nodes v ∈ U do | |
| 3: | $P_v$ ← {0, . . . , $\Delta_v$/s} | |
| 4: | while |U| > 0 do | |
| 5: | for all nodes v ∈ U do | ▷ Tentative coloring |
| 6: | c(v) ← random color in $P_v$ | |
| 7: | I ← ∅ | |
| 8: | for all nodes v ∈ U do | ▷ Conflict resolution |
| 9: | S ← {colors of all the neighbors of v} | |
| 10: | if c (v) ∉ S then | |
| 11: | I ← I ∪ {v} | |
| 12: | remove c(v) from palette of neighbors of v | |
| 13: | U ← U − I | |
| 14: | for all nodes v ∈ U do | ▷ Feed the hungry |
| 15: | if |$P_v$| = 0 then | |
| 16: | $P_v$ ← $P_v$ ∪ {|$P_v$| + 1} | |

Figure 1B:
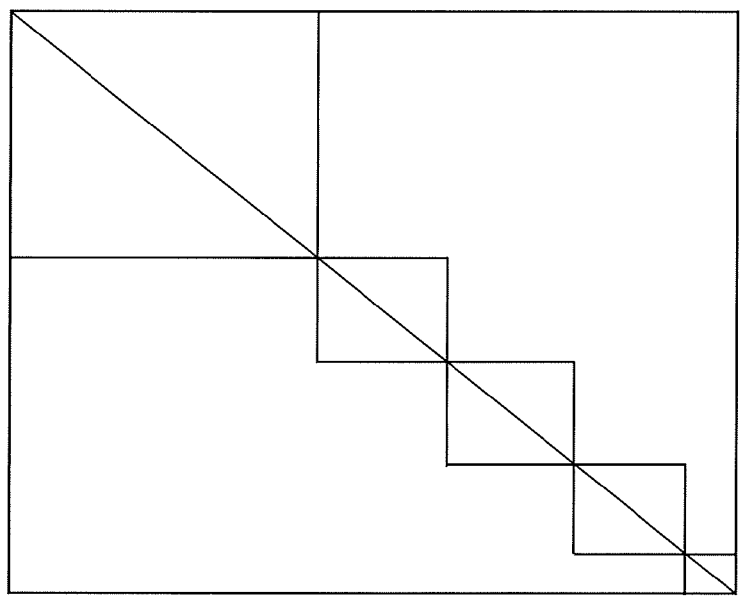

The re-ordering induced by the coloring is illustrated in FIGS. 1a and 1b showing the adjacency matrices corresponding to the constraint graphs. More specifically, these adjacency matrices correspond to the matrix Y in Equation 1 and represent the topology of the constraints in the mesh before (FIG. 1a) and after (FIG. 1b) the coloring. The rows and columns of the matrices represent the indices of the nodes. A matrix element $m_{ij}$ is not empty if the corresponding nodes i and j are shared by a constraint. The rows of the matrices represent equations to be solved, and each equation corresponds to a constraint. The initial matrix (see FIG. 1a) is unordered, and by re-ordering the indices of the nodes in the graph according to their color, the off-diagonal elements are "pushed" away from the diagonal. The final, ordered matrix (see FIG. 1b) have separate blocks along the diagonal. The elements of each block are zero except for the unknowns on the diagonal, so the unknowns of a block are independent from each other and each block can be solved in parallel. The different blocks can be solved one after the other. This is different from traditional back-substitution where the equations are solved one at a time and after each other. Differently stated, as a result of the re-ordering, instead of solving for one unknown after the other as in the lexicographic Gauss-Seidel, all the unknowns belonging to the same color can be solved simultaneously in parallel.

Figure 2:
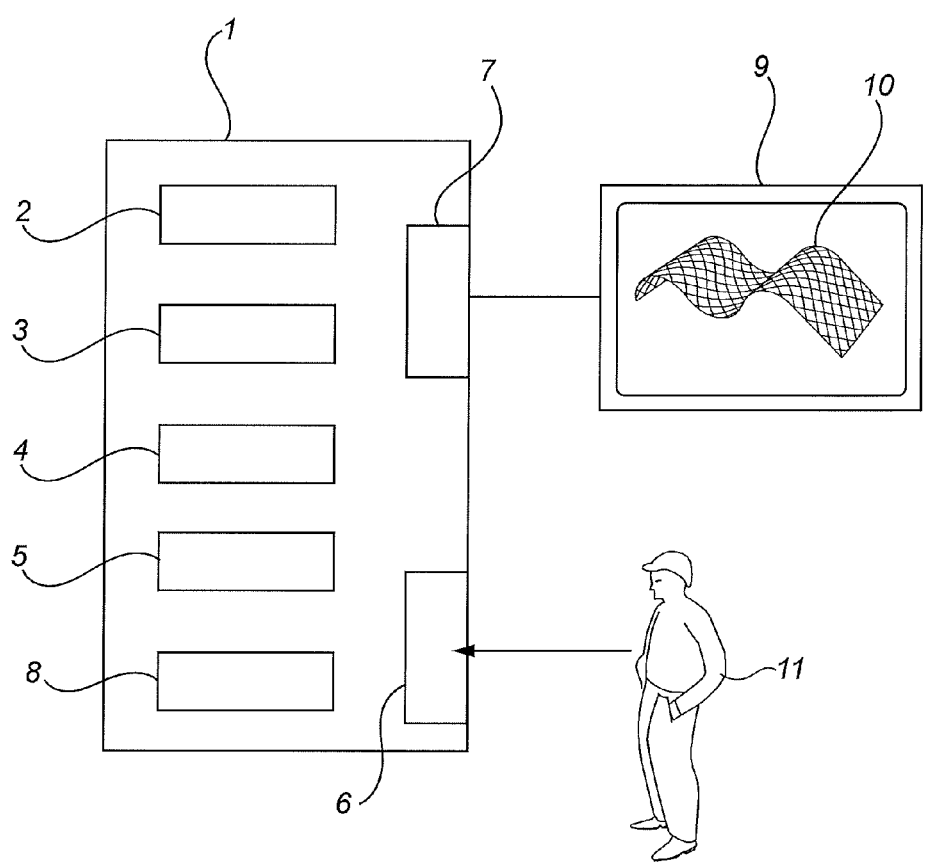
FIG. 2 shows an animation system for interactive, real-time animation of soft body dynamics.

FIG. 2 shows an animation system 1 in the form of a computer capable of performing the method described above. The system 1 comprises a modelling unit 2, a coloring unit 3, a solving unit 4, an updating unit 5, an input port 6 and an output port 7. The system 1 may further comprise a non-transient memory 8, such as a random access memory or a read only memory. The memory 8 has computer readable code stored thereon which implements the above-described method. All or some of the units 2, 3, 4, 5, the ports 6, 7 and the memory 8 may be integrated in a single element, for example a GPU or a CPU, in particular a multicore CPU. Alternatively, all of the units 2, 3, 4, 5, the ports 6, 7 and the memory 8 may be separate elements. A display 9, such as an LED screen or an LCD screen, is connected, either directly or indirectly, to the output port 7. The display 9 may be integrated with the system 1, although in the illustrated example the display 9 is separate from the system 1.

During use of the system 1, the modelling unit 2 generates a 3D model 10 of a soft body, and the model 10 is shown on the display 9 by the system 1. For illustrative purposes, a model 10 in the form of a piece of cloth discretized as a mesh with vertices and edges is shown in FIG. 2. When a user 11 interacts with the model 10, the system 1 receives, via the input port 6, a data signal detailing the interaction. The interaction may for example be that the user 11 pulls the piece of cloth using a computer mouse or, if the display 9 is a touch screen, a finger. At least partly based on the received data signal, the system 1 computes how the model 10 moves in response to the user's 11 interaction with the model 10. A real-time animation of the model 10 is subsequently shown on the display 9 by the system 1.

The system 1 generates the animation of the model 10 by repeatedly solving a set of equations governing the dynamics of the model 10. The equations are solved in the following way. At the beginning of each frame of the animation sequence, the coloring unit 3 partitions the set of equations governing the dynamics of the object 10 such that the unknowns in the equations belonging to the same partition are independent of each other. The partitioning is done using a randomized Brooks-Vizing coloring algorithm. Then, the solving unit 4 solves all the equations belonging to the same partition at the same time in parallel in a single Gauss-Seidel step, i.e. unknowns that belong to the same color are solved in parallel. The model 10 is updated by the updating unit 5, and the updated model 10 is shown on the display 9 by the system 1.

Figure 3:
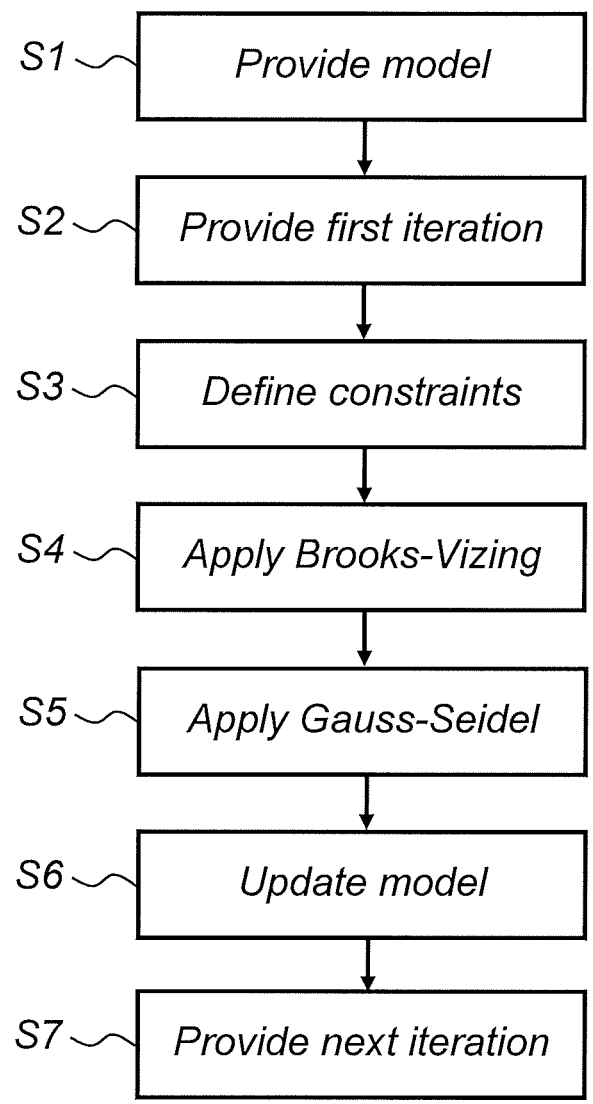
FIG. 3 shows a flowchart of a method for interactive, real-time animation of soft body dynamics.

With reference to FIG. 3, and with continued reference to FIG. 2, the operation of the system 1 may be summarized as follows: the modelling unit 2 provides a 3D model of a soft body 10 in a step S1; the system 1 provides a first iteration of the animation in a step S2; the modelling unit 2 defines a set of physical constraints forming a system of linear equations in a step S3; the coloring unit 3 applies a Brooks-Vizing node coloring algorithm in a step S4; the solving unit 4 solves the system of linear equations by applying a Gauss-Seidel algorithm in a step S5; the updating unit 5 updates the 3D model in a step S6; and the system 1 provides a next iteration of the animation in a step S7.

The person skilled in the art realizes that the present invention by no means is limited to the preferred embodiments described above. On the contrary, many modifications and variations are possible within the scope of the appended claims. For example, the mathematical equations governing the dynamics of the object can be derived using another approach than Projective Dynamics as long as the approach makes it possible to formulate the dynamical equations as a large, sparse linear system of equations. Position Based Dynamics is an example of an approach which may be used instead of Projective Dynamics. Further, it should be noted that each of the tentative coloring phase, the conflict resolution phase and the feed the hungry phase may or may not be performed using parallel computing.

In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

What is claimed is:

1. A method for interactive, real-time animation of soft body dynamics, comprising the steps of:
    providing a 3D model of a soft body, said model comprising a set of vertices connected by edges;
    providing a first iteration of the animation;
    defining a set of physical constraints between vertices in the 3D model, said set of constraints forming a system of linear equations, $Yq=b$, where q is a set of unknowns representing positions of the vertices, Y is a sparse matrix, and b is an energy function comprising effects of external forces;
    solving said system of linear equations by:
        applying a Brooks-Vizing node coloring algorithm to an undirected graph corresponding to the matrix Y, thereby partitioning the system of linear equations into a set of partitions each including an independent subset of unknowns,
        for each partition, applying a Gauss-Seidel based solver in parallel, thereby solving the system of linear equations to determine an approximation of the unknowns;
    using the determined approximation of the unknowns to update the 3D model; and
    providing a next iteration of the animation.

2. The method according to claim 1, wherein the energy function is determined by one of Projection Dynamics and Position Based Dynamics.

3. The method according to claim 1, wherein the number of partitions is equal to or less than the maximum degree of the undirected graph.

4. The method according to claim 1, wherein the number of partitions is equal to $\Delta/s$, where $\Delta$ is equal to the maximum degree of the undirected graph and s is a shrinking factor greater than one.

5. The method according to claim 4, wherein the shrinking factor equals the minimum degree of the undirected graph.

6. The method according to claim 1, wherein the step of solving said system of linear equations further comprises performing successive over-relaxation.

7. The method according to claim 6, wherein an amplification factor ω of the successive over-relaxation is in the range from 1.75 to 1.95.

8. The method according to claim 1, wherein the step of applying a Brooks-Vizing node coloring algorithm is performed in parallel with respect to several nodes of the undirected graph.

9. The method according to claim 1, wherein the step of applying a Brooks-Vizing node coloring algorithm comprises, for each node of the undirected graph, associating a list of $\Delta_v/s$ colors with the node, where $\Delta_v$ is the degree of the node and s is a shrinking factor greater than one.

10. The method according to claim 9, wherein the step of applying a Brooks-Vizing node coloring algorithm further comprises randomly selecting, for each node, a color in the list of colors associated with the node.

11. The method according to claim 10, wherein the step of applying a Brooks-Vizing node coloring algorithm further comprises, for each node,
    if the color selected for the node is different from the colors of all neighboring nodes, accepting the color selected for the node and removing the color selected for the node from the palettes of the neighboring nodes.

12. The method according to claim 11, further comprising, for each node,
    if the color selected for the node is the same as the color of at least one neighboring node and if the node has a higher index than all the neighboring nodes, accepting the color selected for the node.

13. The method according to claim 12, wherein the step of applying a Brooks-Vizing node coloring algorithm further comprises adding a color to the lists of colors which have run out of colors.

14. A non-transitory medium comprising computer code configured to perform the method according to claim 1.

15. An animation system for interactive, real-time animation of soft body dynamics, comprising:
    an input port configured to receive instructions from a user, wherein the input port enables the user to interact in real time with a 3D model of a soft body to be animated;
    an output port connectable to a display for displaying an animation of the soft body based on the received instructions from the user;
    a modelling unit configured to provide the 3D model, said model comprising a set of vertices connected by edges, the modelling unit being further configured to define a set of physical constraints between vertices in the 3D model, said set of constraints forming a system of linear equations, $Yq=b$, where q is a set of unknowns representing positions of the vertices, Y is a sparse matrix, and b is an energy function comprising effects of external forces;
    a coloring unit configured to apply a Brooks-Vizing node coloring algorithm to an undirected graph corresponding to the matrix Y, thereby partitioning the system of linear equations into a set of partitions each including an independent subset of unknowns;
    a solving unit configured to, for each partition, apply a Gauss-Seidel based algorithm in parallel, thereby solving the system of linear equations to determine an approximation of the unknowns; and an updating unit configured to update the 3D model based on the determined approximation of the unknowns.

16. The animation system according to claim 15, wherein the modelling unit is configured to determine the energy function based on one of Projection Dynamics and Position Based Dynamics.

17. The animation system according to claim 15, wherein the coloring unit is configured to partition the system of linear equations into a set of partitions such that the number of partitions is the equal to or less than the maximum degree of the undirected graph.

18. The animation system according to claim 15, wherein the coloring unit is configured to apply a Brooks-Vizing node coloring algorithm in parallel with respect to several nodes of the undirected graph.

19. The animation system according to claim 15, wherein the coloring unit is configured to apply, for each node of the undirected graph, associate a list of $\Delta_v/s$ colors with the node, where $\Delta_v$ is the degree of the node and s is a shrinking factor greater than one.

20. The animation system according to claim 19, wherein the coloring unit is configured to randomly select, for each node, a color in the list of colors associated with the node.

21. The animation system according to claim 20, wherein the coloring unit is configured to, for each node,
if the color selected for the node is different from the colors of all neighboring nodes, accept the color selected for the node and remove the color selected for the node from the palettes of the neighboring nodes.

22. The animation system according to claim 21, wherein the coloring unit is configured to, for each node,
if the color selected for the node is the same as the color of at least one neighboring node and if the node has a higher index than all the neighboring nodes, accept the color selected for the node.

23. The animation system according to claim 22, wherein the coloring unit is configured to add a color to the lists of colors which have run out of colors.

* * * * *